United States Patent Office 2,930,822
Patented Mar. 29, 1960

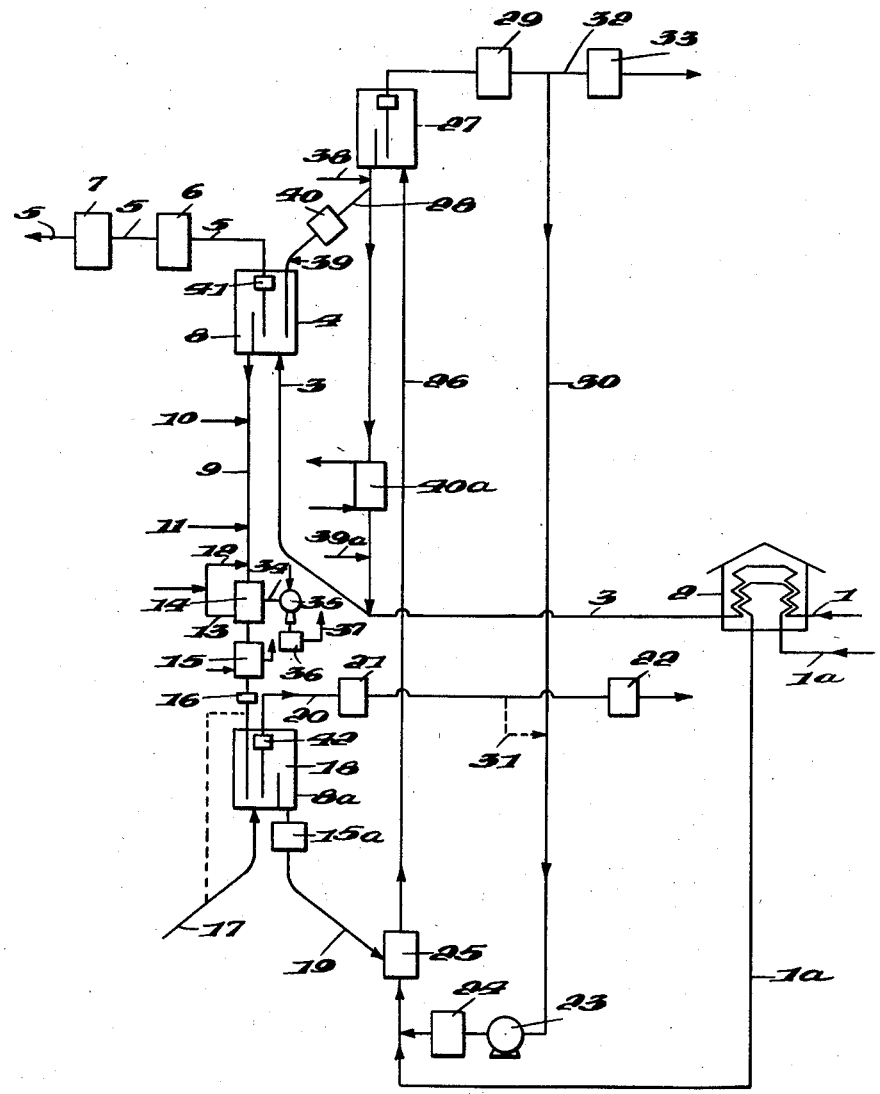

2,930,822
PROCESS AND APPARATUS FOR CARRYING OUT GAS REACTIONS

Paul Baumann, Franz Broich, and Georg Schäfer, all of Marl, Kreis Recklinghausen, Germany, assignors to Chemische Werke Huls Aktiengesellschaft, Kreis Recklinghausen, Germany, a corporation of Germany Application July 15, 1957, Serial No. 671,940

Claims priority, application Germany February 23, 1957

1 Claim. (Cl. 260—680)

In a number of chemical reactions, the amounts of reaction products and the yields achieved are the better the lower is the partial pressure of the reacting substances. This is true generally of those reactions which proceed with increase in volume or in which substances are involved which tend to take part in undesirable secondary or subsequent reactions. This includes, for example, cracking reactions for the production of acetylene or ethylene from higher hydrocarbons, dehydrogenation reactions, such as the catalytic dehydrogenation of ethyl benzene to styrene, of isobutane to isobutylene, and of n-butane to butylene and butadiene, the elemination of hydrogen chloride from dichloroethane to form vinyl chloride, and others. Often the desired low partial pressure is obtained by diluting the reacting gases or vapors with inert gases or water vapor. In cases, however, where the nature of the catalyst used or industrial or economic reasons do not permit of such a dilution by inert gases or water vapor, it is necessary to operate under reduced pressure, as for example in the one-stage catalytic dehydrogenation of butane to butylene and butadiene. Here it is the great sensitivity of the chromium oxide-almina catalyst which forbids the addition of water vapor. As the use of inert gases is ruled out by the expense of working up the resulting reaction mixture, one operates in the known technical methods with stationary catalysts in the pressure range of about 0.1–0.3 atm. abs. Here, however, some fundamental difficulties are encountered.

Butane dehydrogenation is accompanied by secondary reactions which soon inactivate the catalyst by carbon depositions. Although the catalyst can be regenerated by oxidation with air at atmospheric pressure, this continuous and rapid alternation between reaction and regeneration at different temperatures and pressures with intermediate scavenging operations entails considerable complications in the production technique and requires an extremely complicated control mechanism. Also with respect to energy the method is unsatisfactory because in order to avoid heat accumulations in the contact bed during regeneration a very large excess of air must be employed, the heat content of which can be recovered only incompletely.

It has been found that these difficulties can be avoided by working with pulverized catalysts and performing both the reaction and the regeneration in turbulent beds thereof in the manner described hereinafter. The dehydrogenation of n-butane to butadiene, and quite generally those gas reactions on or with solids in the turbulent bed of a reactor where the solids circulate in a continuous stream between the reactor under reduced pressure and a regenerator under an elevated pressure and in which the solids are regenerated and heated by oxygen-containing gases in a turbulent bed, can be carried out advantageously if there is connected in the circulation of the solids between the regenerator and the reactor an auxiliary cycle in which the solids coming from the regenerator are conveyed by means of a gas, first to an intermediate tank and thence to the reactor. Such an auxiliary cycle is employed to particular advantage when, in relation to the material charged, large amounts of solids must be circulated. This is the case, for example, when the solid loses its activity very quickly or when in highly endothermic reactions the heat of reaction is introduced in the reaction zone only as sensible heat by the stream of solids.

The process can be applied to solids of any kind, both to catalytic ones, as for example aluminum oxide catalysts, which may be activated by the oxides of chromium, molybdenum, tungsten, zinc, beryllium, etc. or by heavy metals, such as copper, nickel, cobalt, palladium, platinum, etc., activated iron catalysts, phosphates, natural or synthetic activated silicates, as well as to inert substances, such as sand, quartz, corundum, coke and the like. The size of the solid particles is between 1 and 300 micron, preferably between 20 and 100 micron.

The pressures employed are maintained in the reactor between 0.05 and 0.5 atm. abs., generally between 0.1 and 0.3 atm. abs., and in the regenerator between about 1.0 and 3 atm. abs.

The general procedure is described in the following.

From the reactor, under reduced pressure, the solid to be regenerated and/or heated flows off through a standpipe and is conducted either directly or through a stream of the preheated regeneration air into a turbulent bed of the regenerator under atmospheric or slightly elevated pressure. The height of the standpipe must be such that the pressure of the solid flowing down therein is at least equal to the air pressure prevailing at the entrance to the regenerator or in the regeneration air duct. The apparent density of the consumed solid is between 0.4 and 0.7 kg./l., depending on its nature and on the flow conditions and the height of the standpipe is preferably not less than 30 m. The heated solid drawn from the regenerator runs to a conveyor in which it is picked up by a stream of hot conveyor gas and transported into a high-level tank. Here it separates from the gas stream and now flows again as dense phase to the reactor itself or to the feed line, while the hot conveyor gas leaving the tank is sucked up by a blower and, possibly after reheating, is returned to the conveyor line. In this way the structural height of the entire plant is reduced to an acceptable proportion.

As conveyor gas for the regenerated solid in the auxiliary cycle air may be used which is heated to the required temperature by direct combustion of fuel gas or other fuels. This temperature is equal to the regenerator temperature or little higher and depends on the heat losses in the conveyor system, so that at the entrance to the reactor the solids have the temperature desired for the reaction and the state of operation.

For the dehydrogenation of butane the entrance temperature at the reactor is in the range between 580 and 640° C. when aluminum-chromium oxide catalyst is used. In this case it is advantageous to use as conveyor gas an inert gas instead of air, such as flue gas or nitrogen, as this will at the same time cleanse the catalyst from residues of the regeneration air during conveyance. Also hydrocarbons may be used which are practically stable in the temperature range in question of 580–640° C. e.g. methane or the methane-containing exhaust gases obtained in the decomposition of the reaction mixture. The advantage of this is that then the oxygen adsorbed on the catalyst is consumed before it can come in contact with the hydrocarbons to be converted and lead to the formation of undesirable by-products.

For butane dehydrogenation it is advantageous to use butane itself as conveyor gas in the auxiliary cycle. This is partially dehydrogenated during the conveying, although only to butylene at the prevailing pressure of 1.0–1.5 atm. abs., without appreciable formation of butadiene. By regulation of the supply of fresh butane and tapping a corresponding amount of cycle gas the butylene level and hence also the hydrogen level is preferably maintained at a moderate height, so that, while the less selective peak activity of the freshly regenerated catalyst which tends toward undesirable by-product production is broken, its effectiveness for butadiene formation is not essentially reduced, and that the temperature of the catalyst flowing to the reactor does not drop below a permissible value. The butane-butylene-hydrogen mixture derived from the auxiliary cycle is separated by oil washing, and the butane and butylene are conveyed to the charge material of the reactor. Its butylene content is thereby increased, owing to which the degree of transformation and the yield of butadiene are advantageously increased.

Taking the example of butadiene production from butane, the process will now be described in detail with reference to the accompanying drawing. The n-butane or the n-butane-n-butylene mixture serving as starting material is conveyed from a storage tank (not shown) through line 1 and heated in the furnace 2 to 580–600° C., and it then passes through line 3 into the reactor 4. The latter has a distributing device (not shown) for the butane or butane-butylene mixture entering at the bottom, a separation zone 8, in which the spent catalyst settles out of the reactor and is drawn off through a standpipe 9, as well as a cyclone 41 for the separation of the catalyst from the reaction gas to be drawn off at the head of reactor 4. The butane or butane-butylene mixture flows through the ascending line 3 at a rate of 10–14 m./sec. into the reactor 4, which is under a pressure of 0.1–0.2 atm. abs.

The gas velocity in the turbulent bed of the reactor 4 is 0.4–0.8 m./sec., preferably about 0.5 m./sec. The reactions taking place in the turbulent bed, the dehydrogenation of butane to butylene and butadiene, and the secondary reactions, namely the decomposition to $C_1$, $C_2$ and $C_3$ hydrocarbons and the total decomposition to carbon and hydrogen, are highly endothermal. As the reactor is not additionally heated, the heat for the reaction must be supplied by the sensible heat introduced with the heated circulating catalyst. At an amount of reaction product achieved in the plant of about 25% and a butadiene yield of 60–65% a ratio of catalyst to butane charge of 15–18:1 is required in order to remain within the economic temperature range of 570–600° C.

The reaction gas, which contains besides butadiene and the cleavage products also unreacted butane and butylene, passes, on leaving the reactor, a number of cyclones represented by 41 in which most of the entrained catalyst is separated and returned into the reactor, then flows through line 5 into a wash tower 6 in which the hot gases are cooled for example by washing with oil and cleansed of dust, and finally to the compressor 7, which produces the vacuum in the plant and conveys the gases to a treatment plant which is not shown in the diagram.

The catalyst, whose density in the turbulent bed of the reactor 4 is about 0.3 kg./l., accumulates in the separation zone 8, which may be arranged as desired centrally, peripherally, or laterally, and flows off from there as dense phase (density 0.5–0.6 kg./l.) in a regular stream through the standpipe 9. Its velocity can be regulated by introducing gas along the standpipe 9 through the inlets 10 to 13 and/or by means of the regulator 16. The reaction gas entrained by the catalyst is driven out by blowing an inert gas, e.g. nitrogen or methane, or preferably butane, through the inlet 10 or 11 which gas then partially escapes into the reactor 4 and partially is carried along into the trap 14. Trap 14 is installed in the lower portion of standpipe 9 at a level where the static pressure is approximately equal to the atmospheric pressure, and it prevents the passage of reaction gas or scavenging gas into the regenerator 18 or into the air duct 17, on the one hand, and of air into standpipe 9 on the other. This is done for example in that by means of an ejector 35 the gases and vapors liberated in trap 14 are sucked off through line 34 and conducted away through the line 37 into the processing equipment (not shown) after cooling in the heat exchanger 36. An additional inert gas or vapor trap 15 just before the exit from the standpipe 9 completely prevents a passage of air into the descending solids stream.

The lower end of standpipe 9 opens either directly into the turbulent bed of the regenerator 18 or into the air duct 17, the spent catalyst being seized by the stream of regeneration air, heated in suitable manner to 580–630° C., and conveyed into the regenerator 18 through the duct 17. Regenerator 18 has a distributor grate for the entering air-catalyst mixture, a discharge device for the regenerated catalyst, and a cyclone 42 at the gas outlet. Under the operating conditions the consumed catalyst is laden with 0.1–0.2% of carbon, which is burned off in the regenerator, with simultaneous reheating of the catalyst to the desired temperature of 600–630° C. The pressure in the regenerator is about 1.3 atm. abs. the gas velocity in the turbulent bed between 0.3 and 0.45 cm./sec., the density of the catalyst about 0.28–0.30 kg./l. The catalyst flowing over into the settling zone 8a is drawn off through standpipe 19 and enters the conveyor 25. In it the catalyst encounters the conveyor gas. It is carried up into tank 27 through line 26. If flue gas is used as conveyor gas, this can be conducted from the regenerator 18 through line 20 and the dust filter 21 through the line 31 to the suction side of the blower 23 and thence forced through heater 24 into the conveyor 25. The auxiliary cycle is closed across tank 27, filter 29, and line 30. If flue gas is not used as conveyor gas, it is discharged to atmosphere through line 20, dust filter 21 and heat recovering device 22.

If butane is used as conveyor gas, then this is passed through line 1a through the heater 2 to the conveyor 25. In this case a gas trap 15a must be installed in the catalyst discharge line 19. On the way between conveyor 25 and tank 27 a portion of the butane is dehydrogenated to butylene. The proportion of dehydrogenation can be controlled by the amount of circulating gas, by its hydrogen content, and by the proportion which is drawn off through line 32 over heat exchanger 33 into a processing plant (not shown) in which the hydrogen is separated from the butane and butylene. The hydrocarbons separated from the conveyor gas are added to the fresh butane going to reactor 4, preferably together with the butane-butylene mixture which was recovered in the butadiene separation from the reaction gas. Thereby the butylene proportion in the charge material for reactor 4 is increased in advantageous manner. In a favorable method of operation when mixing fresh butane with recirculated butane mixture from the butadiene extraction a n-butylene level of about 30% adjusts itself in the inlet to the reactor. This can be further increased by addition of the butane-butylene mixture coming from the auxiliary cycle. The variation of the butadiene yield with the butylene content when working at 0.1 atm. abs. and a reactor temperature of 585–590° C. appears from the table:

| Mol Percent n-butylene in the reactor inlet | Butadiene yield, kg./kg. of charge | kg./kg. of charge converted |
|---|---|---|
| 30 | 11.2 | 60.8 |
| 35 | 12.1 | 62.3 |
| 40 | 12.7 | 64.1 |

In the high-level tank 27 of the auxiliary cycle the catalyst is separated from the conveyor gas stream. It flows off through a standpipe 28 into reactor 4. In the standpipe it is maintained in the fluidized state by injection of a small amount of inert gas or butane through lines 38 and 39 (density between 0.5 and 0.65 kg./l.). When using flue gas as conveyor medium in the auxiliary cycle it is desirable to operate a gas trap 40 similar to the trap 14. The conduction of the regenerated catalyst in dense phase from tank 27 directly into the bed of reactor 4 is advisable at the high ratio of catalyst circulation to butane charge as required for supplying the heat of reaction in the reactor. However, especially when working with a smaller amount of circulating catalyst, the tank 27 may be connected directly to the ascending butane line 3 through the pipe 39a and the trap 40a, with corresponding reduction of the structural height of tank 27.

We claim:

In a process of carrying out the dehydrogenation of $C_4$ hydrocarbons to butadiene by means of a turbulent bed of a pulverized dehydrogenation catalyst at a temperature between about 570° C. and about 640° C. the improvement which consists in that the catalyst is circulated in a continuous stream between a reactor for the dehydrogenation, working at a pressure between about 0.05 and 0.5 atm. abs., and a regenerator, working at a pressure between about 1.0 and 3 atm. abs., in which the catalyst is regenerated and reheated by an oxygen containing gas, and the catalyst flowing from the regenerator to the reactor is passed through an auxiliary cycle, in which it is conveyed by means of a heated reducing gas selected from the group consisting of methane, hydrogen containing gases and $C_4$-hydrocarbons.

References Cited in the file of this patent

UNITED STATES PATENTS

| | | |
|---|---|---|
| 2,246,654 | Arveson | June 24, 1941 |
| 2,477,740 | Grote | Aug. 2, 1949 |
| 2,555,210 | Waddill | May 29, 1951 |
| 2,568,379 | Berg | Sept. 18, 1951 |
| 2,711,386 | Delaplaine | June 21, 1955 |
| 2,726,197 | Ewell | Dec. 6, 1955 |
| 2,726,995 | Kassel | Dec. 13, 1955 |
| 2,765,265 | Bourguet | Oct. 2, 1956 |
| 2,798,795 | Rehbein | July 9, 1957 |